(12) United States Patent
Green, Jr. et al.

(10) Patent No.: US 6,970,892 B2
(45) Date of Patent: Nov. 29, 2005

(54) IMPLEMENTING STANDARDS-BASED FILE OPERATIONS IN PROPRIETARY OPERATING SYSTEMS

(75) Inventors: Paul A. Green, Jr., Harvard, MA (US); Otto R. Newman, Groton, MA (US); Robert N. Evans, Stow, MA (US)

(73) Assignee: Stratus Technologies Bermuda LTD, Hamilton (BM)

( * ) Notice: Subject to any disclaimer, the term of this patent is extended or adjusted under 35 U.S.C. 154(b) by 314 days.

(21) Appl. No.: 09/785,607

(22) Filed: Feb. 16, 2001

(65) Prior Publication Data

US 2002/0116408 A1  Aug. 22, 2002

(51) Int. Cl.⁷ ............................................ G06F 17/30
(52) U.S. Cl. .............................. 707/205; 707/1; 707/6; 711/145; 711/171
(58) Field of Search .................. 707/1–10, 100–104.1, 707/200–206; 711/112, 145, 156, 162, 163, 711/170, 171; 717/171

(56) References Cited

U.S. PATENT DOCUMENTS

| | | | |
|---|---|---|---|
| 4,825,354 A | 4/1989 | Agrawal et al. ............... 707/10 |
| 5,151,989 A | 9/1992 | Johnson et al. ................ 707/10 |
| 5,218,696 A | 6/1993 | Baird et al. ...................... 707/1 |
| 5,371,885 A | 12/1994 | Letwin ......................... 707/205 |
| 5,551,020 A | 8/1996 | Flax et al. ................... 707/101 |
| 5,566,328 A | 10/1996 | Eastep ......................... 707/102 |
| 5,608,901 A | 3/1997 | Letwin ......................... 707/205 |
| 5,617,568 A | 4/1997 | Ault et al. .................... 707/101 |
| 5,628,007 A | 5/1997 | Nevarez ...................... 707/102 |
| 5,664,178 A | 9/1997 | Sinofsky ...................... 707/100 |
| 5,761,529 A | 6/1998 | Raji et al. ........................ 710/4 |
| 5,832,274 A * | 11/1998 | Cutler et al. ................. 717/171 |
| 5,950,199 A * | 9/1999 | Schmuck et al. ............... 707/8 |
| 5,960,446 A | 9/1999 | Schmuck et al. ........... 707/205 |
| 5,968,134 A | 10/1999 | Putzolu et al. .............. 709/238 |
| 5,991,763 A * | 11/1999 | Long et al. .................. 707/101 |
| 6,023,706 A | 2/2000 | Schmuck et al. ........... 707/200 |
| 6,055,527 A | 4/2000 | Badger et al. .................. 707/2 |
| 6,098,074 A | 8/2000 | Cannon et al. ............. 707/200 |
| 6,282,602 B1 * | 8/2001 | Blumenau et al. ............. 711/4 |
| 6,385,626 B1 * | 5/2002 | Tamer et al. ................ 707/203 |
| 6,453,383 B1 * | 9/2002 | Stoddard et al. ........... 711/112 |
| 6,542,909 B1 * | 4/2003 | Tamer et al. ............... 707/205 |
| 6,658,437 B1 * | 12/2003 | Lehman ...................... 707/205 |

* cited by examiner

*Primary Examiner*—Shahid Alam
*Assistant Examiner*—Jean Bolte Fleurantin
(74) *Attorney, Agent, or Firm*—Kirkpatrick & Lockhart Nicholson Graham LLP

(57) ABSTRACT

A method for generating a file object identifier. A computer allocates memory to store the identifier. The disk volume holding the file object, the disk block holding the file object, and the value of the offset within the disk block holding the file object are stored in the allocated memory. In one embodiment, the file object is a file, a directory, or a symbolic link. In another embodiment, the memory allocated is 32 bits. In yet another embodiment, the disk volume value is a 4-bit value. In still another embodiment, the disk block value is a 23-bit value. In another embodiment, the block offset value is a 5-bit value. In another embodiment, the offset within the disk block is a multiple of 128 byte increments. In one embodiment, the generated file object identifier is a PORTABLE OPERATING SYSTEM INTERFACE (POSIX) file serial number.

9 Claims, 4 Drawing Sheets

IMPLEMENTING STANDARDS-BASED FILE OPERATIONS IN PROPRIETARY OPERATING SYSTEMS

FIELD OF THE INVENTION

The present invention relates to implementing support for standards-based file operations in proprietary operating systems. In particular, the present invention relates to methods for implementing POSIX-compliant file operations in a proprietary operating system product.

BACKGROUND OF THE INVENTION

Traditionally, computer vendors sold computer systems and software to run on those systems. This software included operating systems and applications developed to run on these operating systems. Eventually, computer vendors released development information and kits to enable third parties to develop applications for a particular vendor's operating system.

Since each operating system typically differed from every other operating system, third-party developers had to either focus their efforts on developing for a particular operating system or face duplicating their efforts in order to support multiple operating systems. As software provided by third-party developers became more important commercially, developers initiated efforts to encourage computer vendors to standardize their operating system products. Standardization of the operating system would reduce the developer effort required to support multiple operating systems. In turn, operating system vendors could comply with these standards to ease the introduction and acceptance of new operating system products.

Businesses make significant investments in computer software and hardware. Naturally they are reluctant to jettison their investment by switching to new computer systems. Rather, they prefer to leverage their investment by purchasing new hardware that runs their old software and operating systems. Therefore, computer vendors face the problem of supporting legacy software systems while simultaneously adopting standards that encourage third-party developers to support their computing products.

SUMMARY OF THE INVENTION

The present invention relates to the problem of standards compliance when supporting legacy systems. One object of the invention is to provide methods for supporting non-native file operation standards on a legacy operating system. Another object of the invention is to describe a functional mapping between file object identifiers in a proprietary operating system and standards-compliant file object identifiers. Still another object of the invention is to provide a fault-tolerant computer running a proprietary operating system and supporting standards-compliant file operations.

In one aspect, the present invention is a method for generating a file object identifier. A computer allocates memory to store the identifier. The disk volume holding the file object, the disk block holding the file object, and the value of the offset within the disk block holding the file object are stored in the allocated memory. In one embodiment, the file object is a file, a directory, or a symbolic link. In another embodiment, the memory allocated is 32 bits. In yet another embodiment, the disk volume value is a 4-bit value. In still another embodiment, the disk block value is a 23-bit value. In another embodiment, the block offset value is a 5-bit value. In another embodiment, the offset within the disk block is a multiple of 128 byte increments. In one embodiment, the generated file object identifier is a PORTABLE OPERATING SYSTEM INTERFACE (POSIX) file serial number.

In another aspect, the present invention is a method for mapping a first file object identifier having a first bit size to a second file object identifier having a second bit size. The first file object identifier is associated with a file object. The first file object identifier is transformed into a second file object identifier based on at least one system file characteristic. The second file object identifier is provided to permit access to the file object. In one embodiment, the file object is a file, a directory, or a symbolic link. In another embodiment, the second bit size is smaller than the first bit size. In another embodiment, the first file object identifier includes a disk volume value, a disk block value and a block offset value. In yet another embodiment, the file system characteristic is a limitation on the number of disks in any logical volume to a 4-bit value. In still another embodiment, the file system characteristic is a requirement that the address granularity inside a disk block equals or exceeds 32 bytes. In yet another embodiment, the file system characteristic is a requirement that file lengths be at least 128 bytes. In another embodiment, the second file object identifier is a POSIX file serial number.

In still another aspect, the present invention is an article of manufacture having computer-readable program means for mapping a first file object identifier having a first bit size to a second file object identifier having a second bit size. The article includes computer-readable program means for receiving a first file object identifier associate with a file object, computer-readable program means for transforming the first file object identifier into a second file object identifier based on at least one file system characteristic, and computer-readable program means for providing the second file object identifier to permit access to the file object. In one embodiment, the file object is a file, a directory, or a symbolic link. In another embodiment, the second bit size is less than the first bit size. In yet another embodiment, the first file object identifier includes a disk volume value, a disk block value, and a block offset value. In yet another embodiment, the second file object identifier is a POSIX file serial number.

In another aspect, the present invention is a fault-tolerant computer having a proprietary operating system and support for standards-compliant file operations. The fault-tolerant computer includes at least two central processing units operated synchronously, a memory module associated with each CPU, an operating system providing operating system functionality and having a standards-compliant interface and a proprietary interface, and an application program invoking the standards-compliant interface. In one embodiment, the proprietary operating system is Stratus Virtual Operating System (VOS). In another embodiment, the standards-compliant file operations are POSIX file operations. In still another embodiment, the standards-compliant interface is a POSIX interface.

BRIEF DESCRIPTION OF THE DRAWINGS

These and other advantages of the invention may be more clearly understood with reference to the specification and the drawings, in which.

In the drawings, like reference characters generally refer to the same parts throughout the different views. The drawings are not necessarily to scale, emphasis instead being placed upon illustrating the principles of the invention.

DETAILED DESCRIPTION OF THE INVENTION

In brief overview, Applicant's invention provides methods and apparatus for implementing support for standards-based file operations on proprietary operating systems. This is achieved through articles of manufacture or computer software that generates unique file object identifiers using information directed to, provided by, or characterizing properties of the proprietary operating system in compliance with established standards. The file object identifiers are generated through a series of bitwise operations on a memory address, or by mapping a value from one bitspace to a value in another bitspace based on certain assumptions or knowledge of properties concerning characteristic of the file system used by the proprietary operating system. In some embodiments, this mapping reduces the order between the first and second bitspaces.

Figure 1:
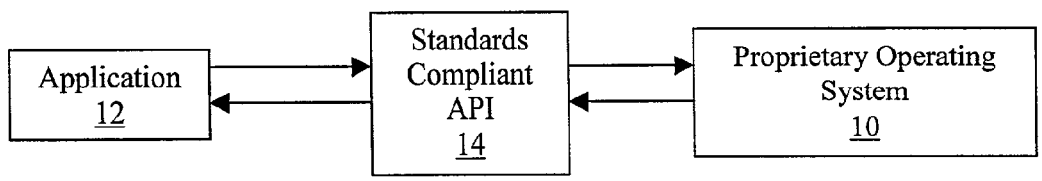
FIG. 1 is a block diagram of an embodiment of the present invention.

Referring to FIG. 1, the present invention adds additional functionality to a proprietary operating system product 10 in order to comply with established standards. This functionality is accessible to a standards-compliant software application 12 running in user mode through an application programming interface (API) 14. The API 14 can be consistent across different operating systems, permitting developers to leverage the code base for application 12 to simplify porting to new platforms running other operating system products 10.

In one embodiment of the invention, compliance with POSIX file system standards is implemented in VOS, a proprietary operating system product by STRATUS COMPUTER of Maynard, Mass. POSIX is an acronym for Portable Operating System Interface, a standard established by the Institute for Electrical and Electronics Engineers (IEEE) to facilitate application portability between different vendor versions of the UNIX operating system. POSIX.1 defines C programming interfaces for a hierarchical file system. Other exemplary, non-limiting embodiments of the present invention address the WINDOWS family of operating systems from MICROSOFT CORPORATION of Redmond, Wash.; various varieties of the UNIX operating system, including but not limited to LINUX; and the MACINTOSH OPERATING SYSTEM from Apple Computer of Cupertino, Calif. These embodiments can also address functionalities included in other established standards from other vendors.

Figure 2:
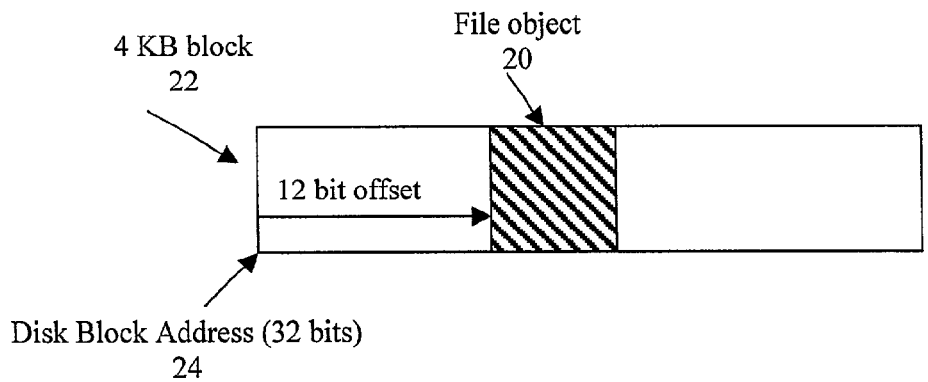
FIG. 2 is a diagram depicting the storage of a file object in a file system in the VOS operating system.
Figure 3:
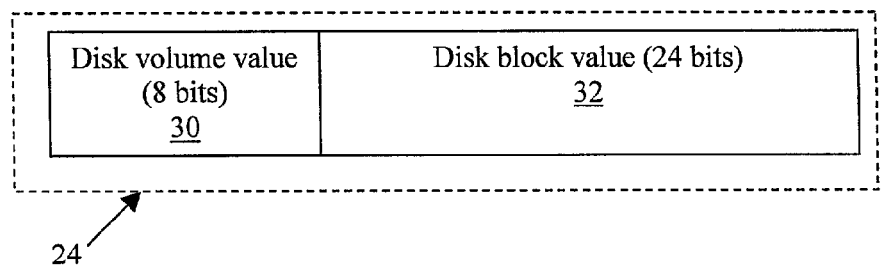
FIG. 3 is a diagram of a VOS disk block address 20.

For clarity, discussion of the present invention is focused on the VOS operating system and POSIX.1 file operations. However, it is to be understood that the present invention encompasses other operating systems and established standards. Referring to FIG. 2, the VOS file system stores file objects 20 as 4 KB disk blocks stored on a disk volume. Other operating systems may store file objects in disk blocks of different sizes. To access a file under VOS, one must provide a 32-bit disk block address 24 uniquely identifying the file. Referring to FIG. 3, a disk block address 24 under VOS includes a 8-bit disk volume value 30 and a 24-bit disk block value 32. Other operating system products may use disk block addresses composed of different values or having a different bit size.

Figure 4:
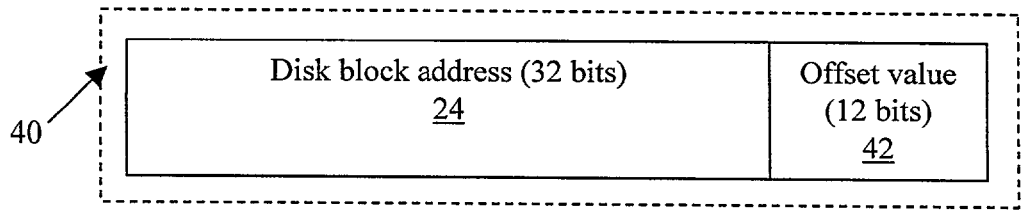
FIG. 4 is a diagram of a first file identifier 20.

The POSIX standard requires that a unique identification number (a "file serial number" or an "inode number") be associated with each file object in a file system. Other established standards may address such issues as operating system utilities, print spooling, batch processing, and native language support/internationalization. Referring to FIG. 4, the generation of a unique identification number for each file object under VOS requires a 44-bit identifier 40. The identifier includes the 32-bit disk block address 24 and a 12-bit disk block offset value 42. The disk block address 24 identifies the 4 KB block 22 within a particular logical volume containing the file object 20 of interest; the offset value 42 indicates the starting point of the file object 20 within the disk block 22. Again, embodiments that address other functionalities in other operating system environments require identifiers composed of different values potentially with different bit sizes.

In an operating system, POSIX file serial numbers are typically implemented as integer values. Most software applications have been and continue to be written assuming that the file serial numbers are integer values. Therefore, although a floating-point implementation is technically possible, it would likely cause failures in legacy applications written assuming that the file serial number is an integer value. Therefore, compliance with the POSIX standard in a file system sharing the characteristics of that used by the VOS operating system requires compiler support for integers at least 44 bits in length. Embodiments of the present invention in other operating system environments addressing functionalities provided by different established standards may require support for different data types with different bit lengths.

The compiler provided with the VOS operating system supports integer values that are 32-bits in length. Modifying the compiler to support larger integer values is a non-trivial task, in part because compiler changes may cause software applications written on the assumption of a 32-bit integer to operate differently. Therefore, the information provided by identifier 40 must be reduced to occupy a 32-bit value in a way that still meets the requirements of the POSIX standard. Of course, other motivations behind compiler support may underlie other embodiments of the present invention. For example, a reduction in bit size can resolve word alignment issues, reduce the storage required in volatile and non-volatile memories, shorten data transmission times, or address the architectural limitations of 8-bit, 16-bit, or 32-bit microprocessor architectures. Some embodiments increase the bit size of the identifier when it is appropriate.

Figure 5:
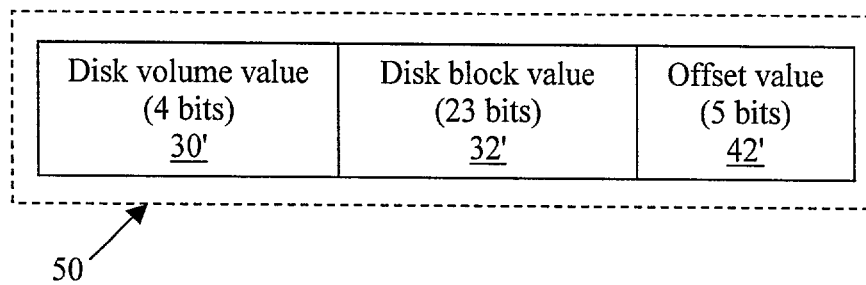
FIG. 5 is a diagram of a second file identifier 30.

In one embodiment of the present invention, assumptions made regarding characteristics of the file system in the proprietary operating system product permit a reduction in bit size while maintaining compliance with established standards. In the VOS operating system, the disk volume value 30' normally requires 8 bits of storage. Referring to FIG. 5, by limiting the number of disks available in a logical volume (i.e., a file system with a root node) under VOS to 16, the disk volume value 30' only requires 4 bits of storage.

Although the VOS operating system permits users to define 32 disks in a logical volume, POSIX compliance requires the users to voluntarily restrict the number of disks to 16 or less. The disk block address 32' normally requires 24 bits, but under the VOS operating system, only 23 bits are actually used. Under VOS, the offset value 42 normally requires 12 bits. However, under the VOS operating system file system objects are at least 4 32-byte chunks in size, so the offset value 42 may be expressed in 128 byte increments, reducing the length of the value required to 5 bits. Specifically, symbolic links are 4 32-byte chunks in size, while directory entries and files are at least 7 32-byte chunks in size. Other file objects are stored in the directory structure with a granularity smaller than 128 bytes, however these file objects are not required to have inode numbers associated with them in accord with established POSIX standards. Referring to FIG. 5, the total length of the reduced identifier is 32 bits, the value required by compiler limitations. In other embodiments addressing different operating systems and different established standards, similar assumptions regarding file system or other system characteristics may be used to effect an increase or a decrease in bit size between relevant values.

The reduction in bit size between a first file object identifier with a first bit size and a second file object identifier with a second bit size is reversable. By providing the second file object identifier (e.g., the inode number for a file), it is possible to determine the original first file object identifier by extracting the value of the disk block and the disk volume from the inode number, and then computing the second file object identifier for every file object in the identified disk block on the identified disk volume. When the computed identifier matches the supplied identifier, the original file object has been located and the first file object identifier is constructed as discussed above.

Figure 6:
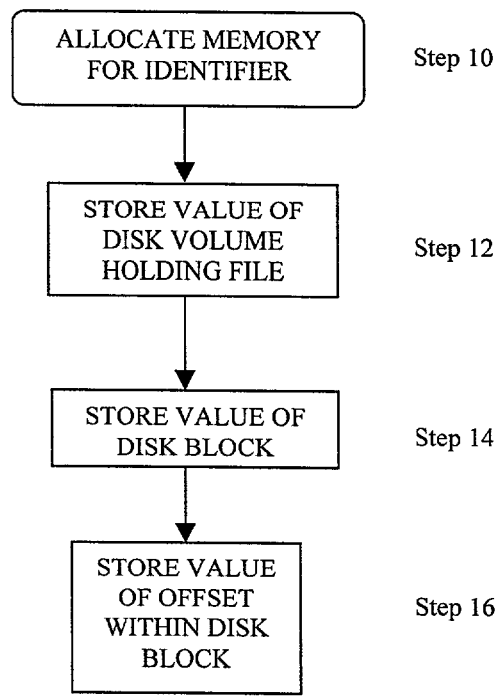
FIG. 6 is a flowchart of a method for generating the second file identifier.

FIG. 6 depicts a method for generating POSIX file object identifiers in the VOS operating system product in accord with the present invention. When an application running under VOS requests a POSIX file serial number, the computer allocates memory for the identifier (Step 10). In one embodiment, the amount of memory allocated is 32 bits. The identifier is aligned along a 64-bit boundary to facilitate future migration to 64-bit integer values. The value of the disk volume holding the file is stored in the highest-order bits of the identifier (Step 12). In one embodiment the value occupies four bits. The value of the disk block holding the file is stored in the next bits of the identifier (Step 14). In one embodiment, this value occupies 23 bits. The value of the offset within the disk block is stored in the lowest order bits of the identifier (Step 16). In one embodiment this value occupies five bits, as the offset is expressed in 128-byte chunks.

Figure 7:
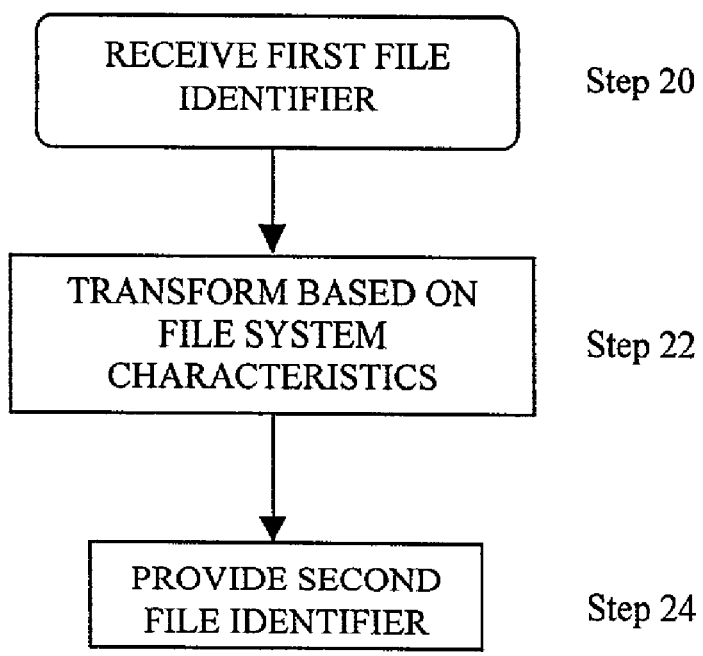
FIG. 7 is a flowchart of a method of mapping a first file identifier into a second file identifier.

Although the file object identifier can be generated using bitwise operations on an allocated identifier, it is also possible to understand embodiments of the present invention as a mapping between a value in a higher-order bitspace to a lower order bitspace. Referring to FIG. 7, a first file object identifier is generated uniquely describing the location of the file object in the file system of the proprietary operating system (Step 20). Using at least one assumption concerning properties of the file system of the proprietary operating system, the first identifier is transformed into a new identifier (Step 22), which is then provided to an invoking application (Step 24). In various embodiments, the assumptions concern the number of disks in a logical volume, the addressing granularity within a disk block, and the minimum file size in the file system in various operating system products.

Figure 8:
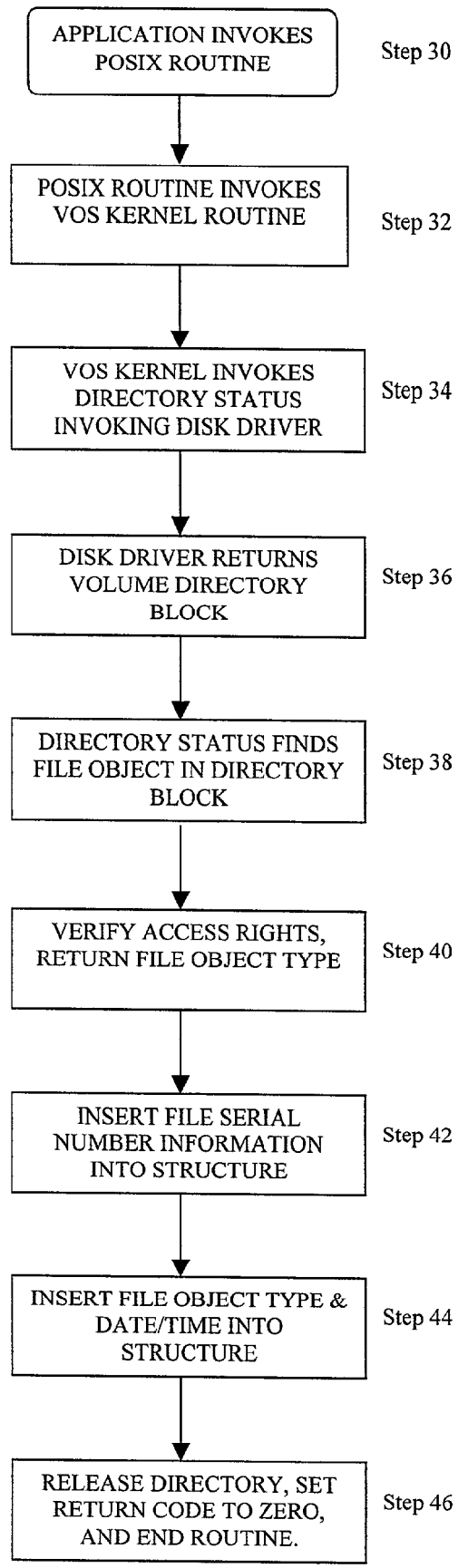
FIG. 8 is a flowchart depicting the process whereby a computer application 12 invokes a POSIX file operation under the VOS operating system.

FIG. 8 is a flowchart depicting how a typical POSIX-compliant application accesses a file under the VOS operating system modified in accord with the present invention. First, the application seeking to access a file invokes a POSIX routine (Step 30). The POSIX routine invokes the "s$get_object_status" routine in the VOS kernel (Step 32). The VOS kernel routine invokes a directory status routine, which in turn invokes a disk driver (Step 34). The disk driver accesses the directory of the addressed disk volume, returning a pointer to the directory block for the volume (Step 36). The directory status routine finds the entry for the specified file object in the directory block (Step 38). The directory status routine verifies the access rights of the application making the file request and returns the type of the file object (e.g., file, directory, or symbolic link) (Step 40). The file serial number is created from the concatenation of three bit fields: the 4 low-order bits of the 8-bit disk volume number of the disk address of the directory block containing the file object directory; the 23 low-order bits of the 24 bits of the disk block number of the block containing the file-object entry; and the 5 low-order bits of the offset of the entry in the disk block in 128-byte increments, and inserted into a field in a file structure passed by the calling application (Step 42). The type of file object and the date and time of creation are inserted into another field in the file structure (Step 44). The directory is released, the return code is set to zero, and the routine ends (Step 46).

It is possible that different generations of file system objects could be assigned the same file serial number value. For example, a newly-created file object occupying the same block and the same offset of a previously-deleted file object would have the same file serial number. By using the date/time information included in the file structure, the calling application identifies situations where the file serial number has been reused.

The system of the present invention may also be provided as computer-readable software code or other such program means embodied on an article of manufacture. The program means may be carried or embodied on any one or more of a variety of articles of manufacture which are capable of transferring the program means to a specialized or general-purpose computer such that the computer runs or executes the program means. The article or articles of manufacture can be, for example, a floppy disk, a removable magnetic disk, a hard drive, an optical disk, a CD-ROM, ROM, or flash memory.

The functions which the computer-readable program means cause to occur or make available include: receiving a first file object identifier, transforming the first file object identifier into a second file object identifier, and providing the second file object identifier. The program means embodied on the article of manufacture may be written in any appropriate computer language, such as PL/I, PASCAL, C, C++, PERL, ADA, assembly language, or machine code.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A computer-implement method for mapping a first file object identifier having a first bit size to a second file object identifier having a second bit size comprising the steps:
   (a) receiving said first file object identifier associated with a file object;
   (b) extracting a disk block value and a disk volume value from said first file object identifier;
   (c) locating a file object in a location on a disk specified by said extracted disk block value and said extracted disk volume value;
   (d) computing a temporary file object identifier for said located file object;
   (e) iterating step (d) for file objects in said specified location on the disk until the temporary file object identifier matches said first file object identifier;
   (f) computing a second file object identifier for said file object with said temporary file object identifier matching said first file object identifier; and
   (g) providing said second file object identifier.

2. The method of claim 1 wherein said first file object identifier is a POSIX file serial number.

3. The method of claim 1 wherein said file object is one of a file, a directory, and a symbolic link.

4. The method of claim 1 wherein said second bit size is less than said first bit size.

5. The method of claim 1 wherein said first file object identifier comprises a disk volume value, a disk block value and a block offset value.

6. The method of claim 1 wherein said at least one file system characteristic comprises limiting the number of disks available in any logical volume to a 4 bit value.

7. The method of claim 1 wherein the second file object identifier limits address granularity within a disk block to at least 32 bytes.

8. The method of claim 1 wherein the second file object identifier limits file object lengths to at least 128 bytes.

9. The method of claim 1 wherein the second file object identifier is a POSIX file serial number.

* * * * *